Nov. 27, 1928.

D. O. BARRETT 1,693,333

BEARING BUSHING

Filed Aug. 12, 1927

WITNESSES

INVENTOR
D. O. Barrett.
BY
ATTORNEY

Patented Nov. 27, 1928.

1,693,333

UNITED STATES PATENT OFFICE.

DWIGHT O. BARRETT, OF SPRINGFIELD, OHIO.

BEARING BUSHING.

Application filed August 12, 1927. Serial No. 212,530.

This invention relates to bearing bushings, and has for an object to provide an improved construction which is easily manufactured and which when completed, presents an accurate bushing structure.

Another object of the invention is to provide a bushing, wherein keys are provided for holding the parts of the bushing properly aligned.

In the accompanying drawing—

Figure 1:
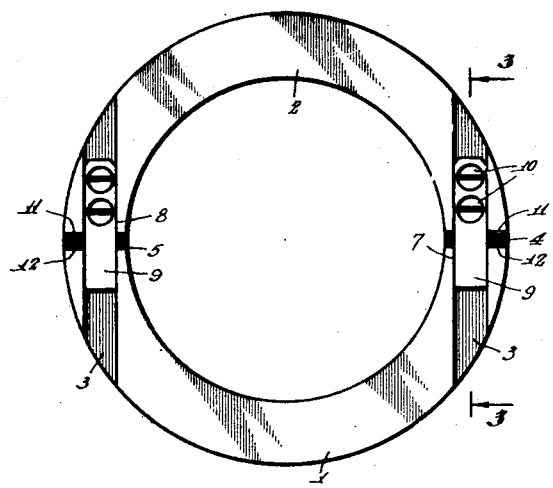
Figure 1 is an end view of a bushing disclosing an embodiment of the invention.
Figure 2:
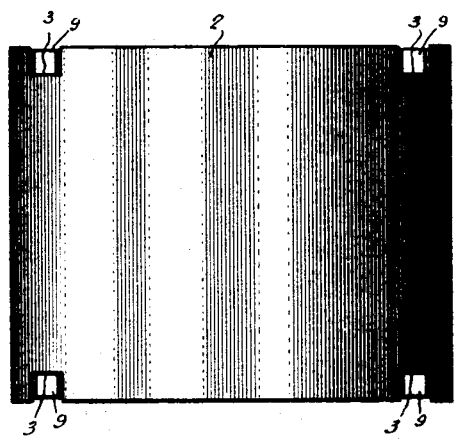
Figure 2 is a top plan view of the bushing shown in Figure 1.
Figure 3:
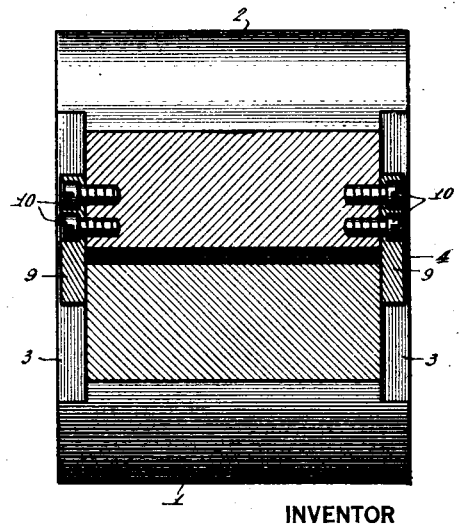
Figure 3 is a sectional view through Figure 1 on line 3—3.

Referring to the accompanying drawing by numerals, 1 and 2 indicate the respective sections of a bushing which may be used for many purposes, but is particularly adapted for connecting rods of engines. In forming bushings heretofore, the parts 1 and 2 are made separate and are finished separate to a large extent, and then fitted together. This requires considerable work to produce a very accurate structure. In the present invention, the parts 1 and 2 are cast integral and then bored and finished as far as the ends and the inside and outside chambers are concerned. After the bore has been properly made and the casting machine on the ends and on the outside surface, slots 3 are made on each side at each end. After this has been done, the sections 1 and 2 are cut apart and the same amount of material removed as indicated by the various shims 4 and 5. These shims may be brass or any desired material, and are formed with notches 7 and 8 at the ends so as to accommodate the respective keys 9. The keys 9 are preferably made from steel and are rigidly secured to one of the sections, namely, section 2 by screws 10. These keys and screws are either flush with the end or slightly below the end. These keys act to hold the sections 1 and 2 properly aligned and against side movement when in use.

It will be noted that the respective faces 11 and 12 are flat instead of offset or stepped as is usually found in bearings. This must be done to cause the use of the keys 9 which take the place of the shoulders formed in the old way, and at the same time prevent any accidental lateral movement. The notches 7 and 8 in the shims cause the shims to straddle the keys 9 and, consequently, the shims are also held operatively in place.

What I claim is:

1. A bushing for bearings, comprising a pair of arc-shaped bearing sections formed with straight slots in the end, guiding keys secured to one section and extending slidingly into the other section, said keys being fitted into said slots, and shims arranged between said sections for spacing the same apart.

2. A bearing bushing, comprising a body formed of two sections, each section having a pair of diametrically oppositely positioned straight grooves at each end, the grooves at one end of one section registering with the grooves at the same end of the other section and keys fitting into said grooves, there being one key for each pair of grooves, and means for rigidly securing the keys to one section so that the keys will also overlap and slidingly fit into the other section for keeping the sections aligned longitudinally and laterally.

3. A tubular bearing bushing, comprising a pair of arc-shaped sections, shims arranged between said sections, said sections having aligned straight grooves at each end, said grooves being spaced from the bore of the bushing and extending in a direction normally to a radial line extending from the axis of the bushing, and a straight key member fitted in each pair of grooves for aligning the sections longitudinally and transversely, said key member being rigidly secured to one of said arc-shaped sections and slidingly fitting into the grooves of the other arc-shaped section.

DWIGHT O. BARRETT.